United States Patent [19]
Joshi et al.

[11] Patent Number: 5,165,241
[45] Date of Patent: Nov. 24, 1992

[54] AIR FUEL MIXER FOR GAS TURBINE COMBUSTOR

[75] Inventors: Narendra D. Joshi, Maineville; Edward E. Ekstedt, Montgomery, both of Ohio

[73] Assignee: General Electric Company, Cincinnati, Ohio

[21] Appl. No.: 660,315
[22] Filed: Feb. 22, 1991
[51] Int. Cl.$^5$ .............................. F02C 1/00; F02G 3/00
[52] U.S. Cl. ........................................ 60/737; 60/740; 60/748
[58] Field of Search .................... 60/737, 740, 748

[56] References Cited

U.S. PATENT DOCUMENTS

| | | | |
|---|---|---|---|
| 2,269,699 | 1/1942 | Stoecker et al. | 158/109 |
| 2,815,069 | 12/1957 | Garraway | 158/76 |
| 3,030,773 | 4/1962 | Johnson | 60/748 |
| 3,385,055 | 5/1968 | Koblish et al. | 60/39.69 |
| 3,452,933 | 7/1969 | Hakluytt | 239/399 |
| 3,605,405 | 9/1971 | DuBell et al. | 60/748 |
| 3,703,259 | 11/1972 | Sturgess et al. | 60/748 |
| 3,713,588 | 1/1973 | Sharpe | 239/400 |
| 3,724,207 | 4/1973 | Johnson | 60/39.74 |
| 3,808,803 | 5/1974 | Salvi | 60/39.74 |
| 3,915,387 | 10/1975 | Caruel et al. | 239/400 |
| 3,917,173 | 11/1975 | Singh | 239/400 |
| 3,927,835 | 12/1975 | Gerrard | 60/748 |
| 3,938,326 | 2/1976 | DeCorso et al. | 60/39.74 |
| 3,958,416 | 5/1976 | Hammond et al. | 60/39.65 |
| 3,980,233 | 9/1976 | Simmons et al. | 239/400 |
| 4,194,358 | 3/1980 | Stenger | 60/748 |
| 4,198,815 | 4/1980 | Bobo et al. | 60/737 |
| 4,216,652 | 8/1980 | Herman et al. | 60/748 |
| 4,222,243 | 9/1980 | Mobsby | 60/748 |
| 4,408,461 | 10/1983 | Brühwiler et al. | 60/737 |
| 4,587,809 | 5/1986 | Ohmori et al. | 60/737 |
| 4,589,260 | 5/1986 | Krockow | 60/737 |
| 4,653,278 | 3/1987 | Vinson et al. | 60/737 |
| 4,701,124 | 10/1987 | Maghon et al. | 431/284 |
| 4,835,959 | 6/1989 | Coffinberry | 60/212 |
| 4,932,861 | 6/1990 | Keller et al. | 431/8 |
| 4,999,996 | 3/1991 | Duchene et al. | 60/39.32 |
| 5,009,589 | 4/1991 | Shekleton et al. | 60/748 |
| 5,020,329 | 6/1991 | Ekstedt et al. | 60/737 |
| 5,022,849 | 6/1991 | Yoshii et al. | 431/2 |
| 5,062,792 | 11/1991 | Maghon | 431/284 |
| 5,066,221 | 11/1991 | Becker | 431/280 |
| 5,085,575 | 2/1992 | Keller et al. | 431/8 |

FOREIGN PATENT DOCUMENTS 0720252 3/1980 U.S.S.R. .

OTHER PUBLICATIONS

K. O. Smith, M. H. Samii and H. K. Mal (authors), "Experimental Evaluation of a Low Emissions, Variable Geometry, Small Gas Turbine Combustor", Presented at the Gas Turbine and Aeroengine Congress and Exposition, Jun. 11–14, 1990–Brussels, Belgium.

H. Maghon, P. Berenbrink, H. Termuehlen and G. Gartner (authors), "Progress in NOx and CO Emission Reduction of Gas Turbines", Oct. 21–25, 1990 Presented at the Joint ASME/IEEE Power Generation Conference, Boston, MA.

A. Sviridenkov and V. Tret'yakov (authors), "Distribution of Velocity Pulsations in a Channel with Mixing of Oppositely Swirled Streams", pp. 47–53, Jul. 1984 (translated from Inzhenerno–Fizicheskii Zhurnal, vol. 47, No. 1) Original article submitted Apr. 8, 1983.

A. Sviridenkov, V. Tret'yakov and V. Yagodkin (authors), "Effectiveness of Mixing Coaxial Flows Swirled in Opposite Directions", pp. 407–413, Sep. 1981; translated from Inzhenerno–Fizicheskii Zhurnal, vol. 41, No. 3. Original article submitted Jun. 23, 1980.

W. Cheng (author), "Reactive Mixing in Swirling Flows", Presented Jul. 14–16, 1980, AIAA 13th Fluid & Plasma Dynamics Conference, Showmass, Colo.

Primary Examiner—Richard A. Bertsch
Assistant Examiner—Howard R. Richman
Attorney, Agent, or Firm—James P. Davidson; Jerome C. Squillaro

[57] ABSTRACT

A mixer having a mixing duct, a set of inner and outer counter-rotating swirlers at the upstream end of the mixing duct, and a fuel nozzle located axially along and forming a center-body of the mixing duct is provided, wherein high pressure air from a compressor is injected into the mixing duct through the swirlers to form an intense shear region and fuel is injected into the mixing duct from the fuel nozzle so that the high pressure air and the fuel is uniformly mixed therein so as to produce minimal formation of pollutants when the fuel/air mixture is exhausted out the downstream end of said mixing duct into the combustor and ignited.

15 Claims, 3 Drawing Sheets

AIR FUEL MIXER FOR GAS TURBINE COMBUSTOR

BACKGROUND OF THE INVENTION

1. Field of the Invention

The present invention relates to an air fuel mixer for the combustor of a gas turbine engine, and, more particularly, to an air fuel mixer for the combustor of a gas turbine engine which uniformly mixes fuel and air so as to reduce NOx formed by the ignition of the fuel/air mixture.

2. Description of Related Art

Air pollution concerns worldwide have led to stricter emissions standards requiring significant reductions in gas turbine pollutant emissions, especially for industrial and power generation applications. Nitrous Oxide (NOx), which is a precursor to atmospheric pollution, is generally formed in the high temperature regions of the gas turbine combustor by direct oxidation of atmospheric nitrogen with oxygen. Reductions in gas turbine emissions of NOx have been obtained by the reduction of flame temperatures in the combustor, such as through the injection of high purity water or steam in the combustor. Additionally, exhaust gas emissions have been reduced through measures such as selective catalytic reduction. While both the wet techniques (water/steam injection) and selective catalytic reduction have proven themselves in the field, both of these techniques require extensive use of ancillary equipment. Obviously, this drives the cost of energy production higher. Other techniques for the reduction of gas turbine emissions include "rich burn, quick quench, lean burn" and "lean premix" combustion, where the fuel is burned at a lower temperature.

In a typical aero-derivative industrial gas turbine engine, fuel is burned in an annular combustor. The fuel is metered and injected into the combustor by means of multiple nozzles into a venturi along with combustion air having a designated amount of swirl. No particular care has been exercised in the prior art, however, in the design of the nozzle, the venturi or the dome end of the combustor to mix the fuel and air uniformly to reduce the flame temperatures. Accordingly, non-uniformity of the air/fuel mixture causes the flame to be locally hotter, leading to significantly enhanced production of NOx.

In the typical aircraft gas turbine engine, flame stability and variable cycle operation of the engine dominate combustor design requirements. This has in general resulted in combustor designs with the combustion at the dome end of the combustor proceeding at the highest possible temperatures at stoichiometeric conditions. This, in turn, leads to large quantities of NOx to be formed in such gas turbine combustors since it has been of secondary importance.

While premixing ducts in the prior art have been utilized in lean burning designs, they have been found to be unsatisfactory due to flashback and auto-ignition considerations for modern gas turbine applications. Flashback involves the flame of the combustor being drawn back into the mixing section, which is most often caused by a backflow from the combustor due to compressor instability and transient flows. Auto-ignition of the fuel/air mixture can occur within the premixing duct if the velocity of the air flow is not fast enough, i.e., where there is a local region of high residence time. Flashback and auto-ignition have become serious considerations in the design of mixers for aero-derivative engines due to increased pressure ratios and operating temperatures. Since one desired application of the present invention is for the LM6000 gas turbine engine, which is the aero-derivative of General Electric's CF6-80C2 engine, these considerations are of primary significance.

While the effects of counter-rotating swirl have been studied (e.g., "Effectiveness of Mixing Coaxial Flows Swirled in Opposite Directions," by A. Sviridenkov, V. Tret'yakov, and V. Yagodkin; "Distribution of Velocity Pulsations in a Channel with Mixing of Oppositely Swirled Streams," by A. Sviridenkov and V. Tret'yakov; and "Reactive Mixing in Swirling Flows," by W. Cheng), they have not been utilized with fuel injection techniques that uniformly premix the fuel and air prior to combustion. Likewise, fuel nozzles and injectors which inject fuel into an air flow for premixing, such as the radial fuel spokes in "Experimental Evaluation of a Low Emissions, Variable Geometry, Small Gas Turbine Combustor," by K. O. Smith, M. H. Samii, and H. K. Mak and the fuel injector having a conical tip in U.S. Pat. No. 4,653,278 to Vinson, et al, neither combine with the intense shear region provided by counter-rotating swirlers nor inject the fuel substantially perpendicular to the duct or air flow to maximize mixing.

Accordingly, a primary objective of the present invention is to provide an air fuel mixer for an aero-derivative gas turbine engine which avoids the problems of auto-ignition and flashback.

Another objective of the present invention is to provide an air fuel mixer which includes means for providing an intense shear region therein which causes uniform mixing of fuel and high pressure air to minimize the formation of pollutants when the fuel/air mixture is exhausted out the downstream end of the mixer into the combustor and ignited.

Yet another objective of the present invention is to provide an air fuel mixer which uniformly mixes fuel and air without incurring backflow from the combustor.

Another objective of the present invention is to provide an air fuel mixer which supplies a significant swirl to the fuel/air mixture so as to result in an adverse pressure gradient in the primary combustion region of the combustor and a consequent hot recirculation zone therein.

Still another objective of the present invention is to inject fuel into an air fuel mixer in such a manner as to maximize mixing therein.

Another objective of the present invention is to provide an air fuel mixer which provides the maximum amount of mixing between fuel and air supplied thereto in the limited amount of space available in an aero-derivative engine.

These objectives and other features of the present invention will become more readily apparent upon reference to the following description when taken in conjunction with the following drawings.

SUMMARY OF THE INVENTION

In accordance with one aspect of the present invention, an air fuel mixer having a mixing duct, a set of inner and outer counter-rotating swirlers at the upstream end of the mixing duct, and a fuel nozzle located axially along and forming a center-body of the mixing duct is provided, wherein high pressure air from a compressor is injected into the mixing duct through the swirlers to form an intense shear region and fuel is injected into the mixing duct from the fuel nozzle so that the high pressure air and the fuel is uniformly mixed therein so as to produce minimal formation of pollutants when the fuel/air mixture is exhausted out the downstream end of the mixing duct into the combustor and ignited.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
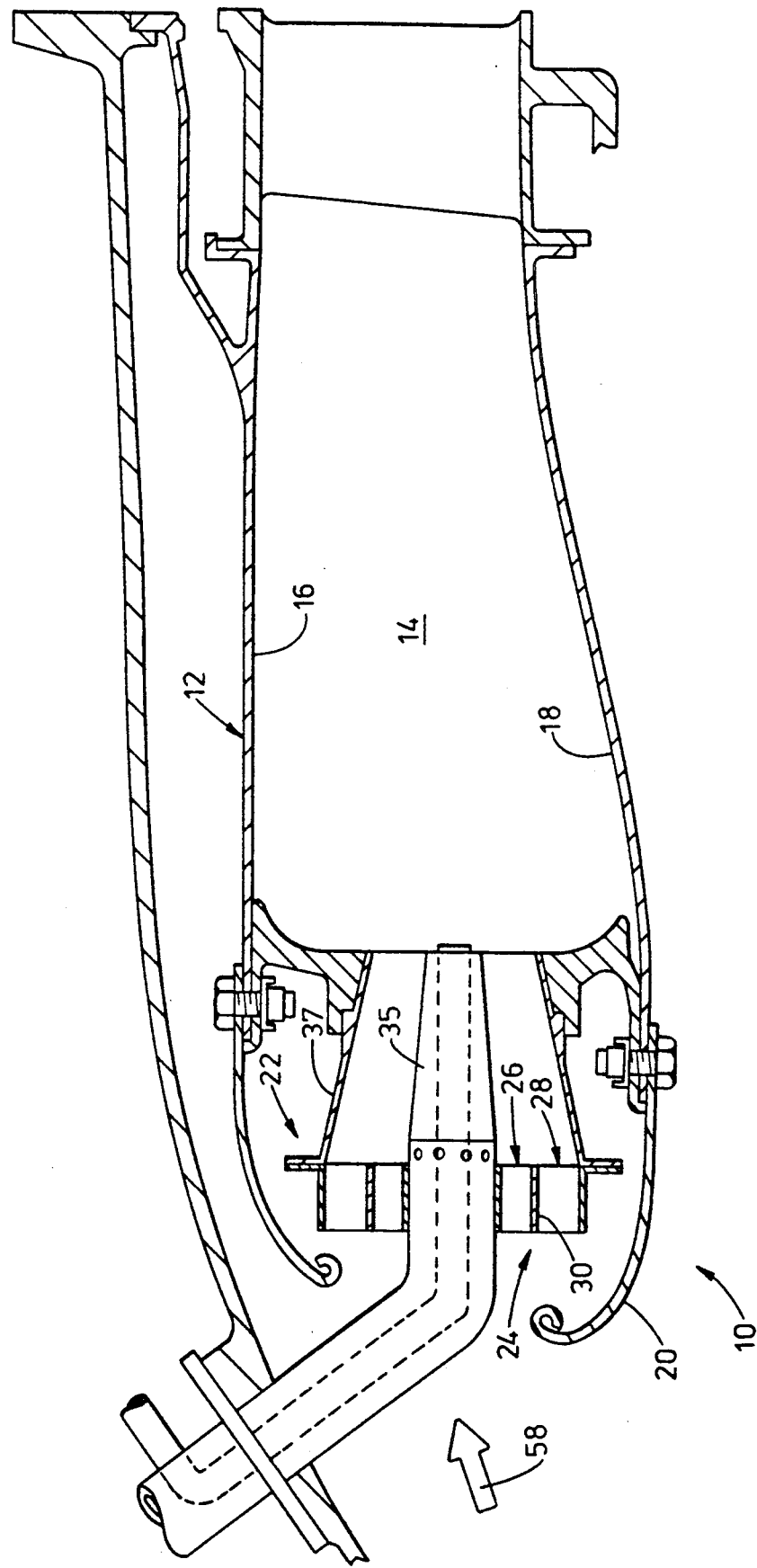
FIG. 1 is a longitudinal sectional view through a combustor structure.

Referring now to the drawings in detail, wherein identical numerals indicate the same elements throughout the figures, FIG. 1 depicts a continuous-burning combustion apparatus 10 of the type suitable for use in a gas turbine engine and comprising a hollow body 12 defining a combustion chamber 14 therein. Hollow body 12 is generally annular in form and is comprised of an outer liner 16, an inner liner 18, and a domed end or dome 20. It should be understood, however, that this invention is not limited to such an annular configuration and may well be employed with equally effectiveness and combustion apparatus of the well-known cylindrical can or cannular type. In the present annular configuration, the domed end 20 of hollow body 12 includes a swirl cup 22, having disposed therein a mixer 24 of the present invention to allow the uniform mixing of fuel and air therein and the subsequent introduction of the fuel/air mixture into combustion chamber 14 with the minimal formation of pollutants caused by the ignition thereof. Swirl cup 22, which is shown generally in FIG. 1, is made up of mixer 24, and the swirling means described below.

Figure 2:
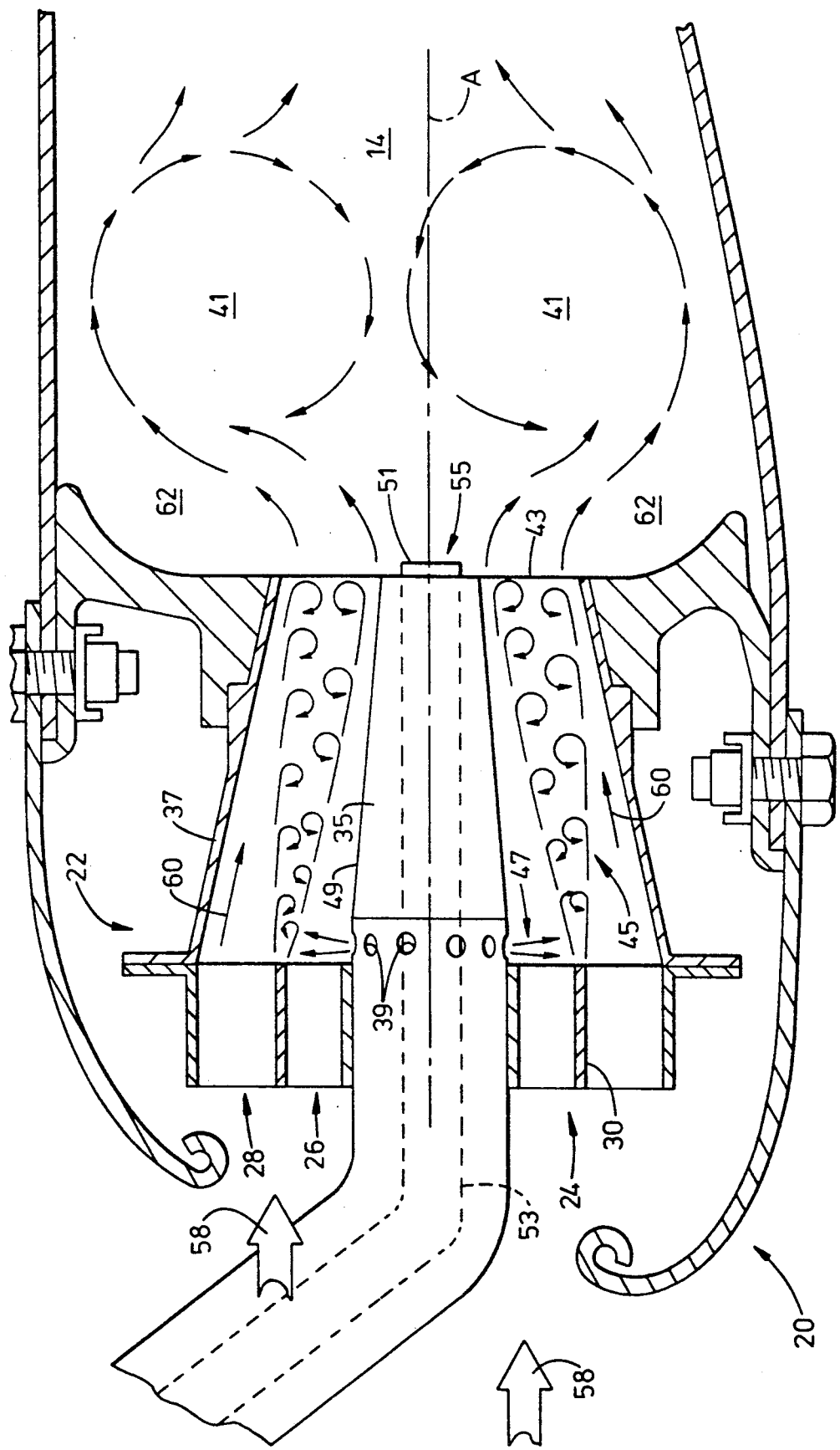
FIG. 2 is an enlarged view of the air fuel mixer of the present invention and combustor dome portion of FIG. 1.
Figure 3:
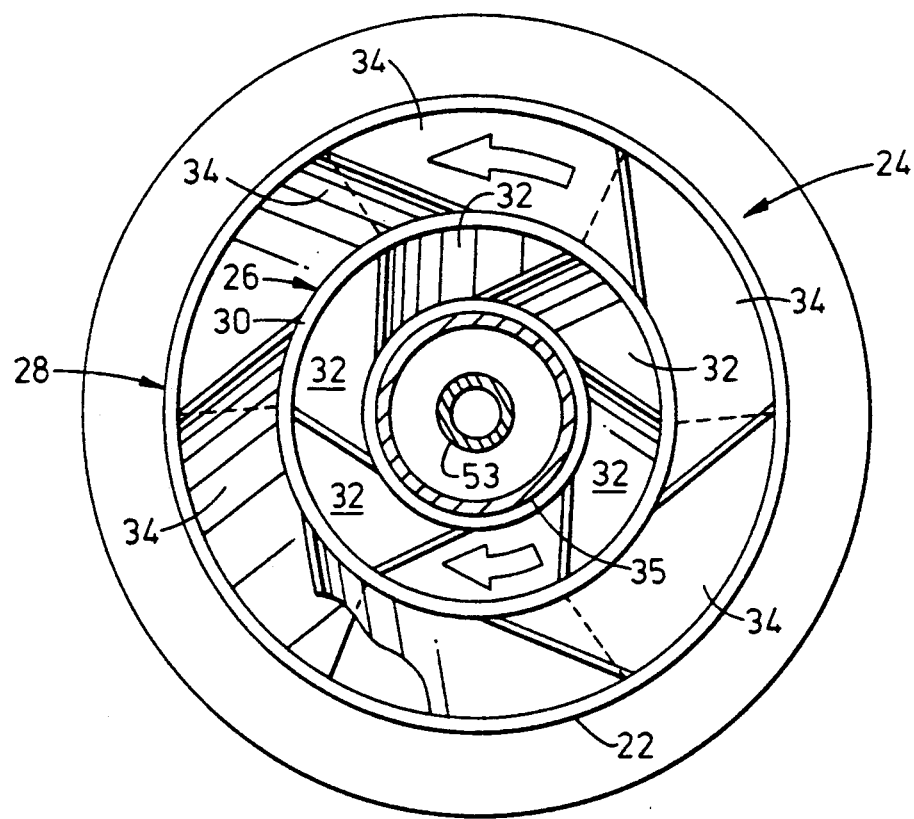
FIG. 3 is a front view of the air fuel mixer depicted in FIG. 2 of the present invention.

As best seen in FIG. 2, mixer 24 includes inner swirler 26 and outer swirler 28 which are brazed or otherwise set in swirl cup 22, where inner and outer swirlers 26 and 28 preferably are counter-rotating (see FIG. 3). It is of no significance which direction inner swirler 26 and outer swirler 28 rotate so long as they do so in opposite directions. Inner and outer swirlers 26 and 28 are separated by a hub 30, which allows them to be co-annular and separately rotatable. As depicted in FIG. 2, inner and outer swirlers 26 and 28 are preferably axial, but they may be radial or some combination of axial and radial. It will be noted that swirlers 26 and 28 have vanes 32 and 34 (see FIG. 3) at an angle in the 40°–60° range with an axis A running through the center of mixer 24. Also, the air mass ratio between inner swirler 26 and outer swirler 28 is preferably approximately ⅓.

A fuel nozzle 35 is positioned at the center of inner swirler 26 and outer swirler 28. Downstream of inner and outer swirlers 26 and 28 is an annular mixing duct 37. Fuel nozzle 35 has a set of holes 39 positioned preferably immediately downstream of inner swirler 26 from which fuel is preferably injected substantially perpendicular to axis A or airstream 60 into mixing duct 37 to enhance mixing. While the number and size of injection holes 39 is dependent on the amount of fuel flowing through fuel nozzle 35, the pressure of the fuel, and the number and particular design of swirlers 26 and 28, it has been found that 6 to 12 holes work adequately. Injection holes 39 may be aligned with the trailing edges of inner swirler 26 to make use of vane wakes and enhance mixing. In case the air temperature and pressure are conducive to auto-ignition of the fuel in a short residence time, then injection holes 39 should not be in line with the wakes of the vanes of inner swirler 26.

Fuel nozzle 35 may be a straight cylindrical section or preferably one which converges substantially uniformly from its upstream end to its downstream end. If desired, the frontal area of fuel nozzle 35 may be decreased to present as small a cross-section for heating from the flame or increased to curve the entry of the downstream flame recirculation zone 41 (discussed in more detail herein) from mixing duct 37. This is because fuel nozzle 35 extends through the entire length of mixing duct 37 and not only can provide fuel through holes 39, but also through tip 55.

Inner and outer swirlers 26 and 28 are designed to pass a specified amount of air flow and fuel nozzle 35 is sized to permit a specified amount of fuel flow so as to result in a lean premixture at exit plane 43 of mixer 24. By "lean" it is meant that the fuel/air mixture contains more air than is required to fully combust the fuel, or an equivalence ratio of less than one. It has been found that an equivalence ratio in the range of 0.3–0.6 is preferred.

The air flow 60 exiting inner swirler 26 and outer swirler 28 sets up an intense shear layer 45 in mixing duct 37. The shear layer 45 is tailored to enhance the mixing process, whereby jets 47 of fuel from centrally located fuel nozzle 35 are uniformly mixed with intense shear layer 45 from swirlers 26 and 28, as well as prevent backflow along the inner surface 49 of mixing duct 37. Mixing duct 37 may be a straight cylindrical section, but preferably should be uniformly converging from its upstream end to its downstream end so as to increase fuel velocities and prevent backflow from primary combustion region 62. Additionally, the converging design of mixing duct 37 acts to accelerate the fuel/air mixture flow uniformly, which prevents boundary layers from accumulating along the sides thereof and flashback stemming therefrom. (Inner and outer swirlers 26 and 28 may also be of a like converging design).

While it is contemplated that the present invention will generally be utilized for gaseous fuels, liquid fuels also may be utilized therewith. Accordingly, the downstream end of fuel nozzle 35 may include liquid atomizers 51, as well as liquid atomizers replacing or in addition to holes 39 for operation of the engine on liquid fuels. Liquid fuels are supplied in a metered fashion to liquid atomizer 51 through a liquid flow circuit 53 wholly contained within fuel nozzle 35. Liquid circuit 53 can also be utilized to supply gas to fuel nozzle tip 55 in order to provide a pilot nozzle flame, as well as to inject a controlled amount of air into combustor chamber 14 with the intent of cooling fuel nozzle tip 55.

In operation, compressed air 58 from a compressor (not shown) is injected into the upstream end of mixer 24 where it passes through inner and outer swirlers 26 and 28 and enters mixing duct 37. Fuel is injected into air flow stream 60 (which includes intense shear layers 45) from injection holes 39 of fuel nozzle 35 as jets of fuel 47. At the downstream end of mixing duct 37, the fuel/air mixture is exhausted into a primary combustion region 62 of combustion chamber 14 which is bounded by inner and outer liners 18 and 16. The fuel/air mixture then burns in combustion chamber 14, where a flame recirculation zone 41 is set up with help from the swirling flow exiting mixing duct 37. In particular, it should be emphasized that the two counter-rotating air streams emanating from swirlers 26 and 28 form very energetic shear layers 45 where intense mixing of fuel and air is achieved by intense dissipation of turbulent energy of the two co-flowing air streams. The fuel is injected into these energetic shear layers 45 so that macro (approximately 1 inch) and micro (approximately one thousandth of an inch or smaller) mixing takes place in a very short region or distance. In this way, the maximum amount of mixing between the fuel and air supplied to mixing duct 37 takes place in the limited amount of space available in an aero-derivative engine (approximately 2-4 inches).

Testing of the invention disclosed herein reveals that NOx levels of as low as one part per million have been achieved. Naturally, such NOx levels in a "dry" environment (one without water or steam injection) are clearly superior to levels attained by other engines in the art.

It is important to note that mixing duct 37 is sized to be just long enough for mixing of the fuel and air to be completed in mixing duct 37 without the swirl provided by inner and outer swirlers 26 and 28 having dissipated to a degree where the swirl does not support flame recirculation zone 41 in primary combustion region 62. In order to enhance the swirled fuel/air mixture to turn radially out and establish the adverse pressure gradient in primary combustion region 62 to establish and enhance flame recirculation zone 41, the downstream end of mixing duct 37 may be flared outward. Flame recirculation zone 41 then acts to promote ignition of the new "cold" fuel/air mixture entering primary combustion region 62.

Alternatively, mixing duct 37 and swirlers 26 and 28 may be sized such that there is little swirl at the downstream end of mixing duct 37. Consequently, the flame downstream becomes stabilized by conventional jet flame stabilization behind a bluff body (e.g., a perforated plate) instead of flame recirculation zone 41.

Having shown and described the preferred embodiment of the present invention, further adaptations of the mixer for providing uniform mixing of fuel and air can be accomplished by appropriate modifications by one of ordinary skilled in the art without departing from the scope of the invention.

I claim:

1. An apparatus for premixing fuel and air prior to combustion in a gas turbine engine, comprising:
   (a) a linear mixing duct having a circular cross-section;
   (b) a set of inner and outer annular counter-rotating swirlers adjacent the upstream end of said mixing duct;
   (c) a hub separating said inner and outer annular swirlers to allow independent rotation thereof, said hub extending only the length of said swirlers; and
   (d) a fuel nozzle located axially along and forming a centerbody substantially the full length of said mixing duct, said fuel nozzle having a plurality of orifices therein located immediately downstream of said inner and outer annular swirlers to inject fuel into said mixing duct;
wherein high pressure air from a compressor is injected into said mixing duct through said swirlers to form an intense shear region and fuel is injected into said mixing duct from said fuel nozzle, said mixing duct having a length so that the high pressure air and the fuel is uniformly mixed therein so as to product minimal formation of pollutants when the fuel/air mixture is exhausted out the downstream end of said mixing duct into the combustor and ignited.

2. The apparatus of claim 1, wherein a lean premixture of air and fuel is provided at an exit plane of said mixing duct.

3. The apparatus of claim 1, wherein said swirlers are axial.

4. The apparatus of claim 1, wherein at least one of said swirlers is radial.

5. The apparatus of claim 1, wherein said fuel nozzle injects fuel substantially perpendicular to said mixing duct.

6. The apparatus of claim 1, wherein significant swirl is imparted to the fuel/air mixture so as to result in an adverse pressure gradient in a primary combustion region of the combustor, whereby a hot recirculation zone is established and enhanced in said primary combustion region.

7. The apparatus of claim 1, wherein said mixing duct converges substantially uniformly as it extends from its upstream end to its downstream end.

8. The apparatus of claim 6, wherein said mixing duct is sized to be just long enough for mixing to be completed in said duct without the swirl provided by said swirlers having dissipated to a degree where the swirl does not support a recirculation zone in the primary combustion region.

9. The apparatus of claim 1, wherein said fuel nozzle converges substantially uniformly as it extends from its upstream end to its downstream end.

10. The apparatus of claim 6, wherein the downstream end of said mixing duct is flared outwards to enable the swirled fuel/air mixture to turn radially out and establish the adverse pressure gradient in the primary combustion region to establish and enhance said recirculation zone.

11. The apparatus of claim 1, wherein said fuel nozzle injects fuel substantially perpendicular to air flow in said mixing duct.

12. The apparatus of claim 1, wherein said inner and outer annular swirlers are positioned in the same radial plane.

13. The apparatus of claim 1, wherein both said inner and outer annular swirlers are positioned within said mixing duct.

14. The apparatus of claim 1, wherein the ratio of the radius of said fuel nozzle to the radius of said mixing duct is in the range of 1:3-1:4.

15. An apparatus for premixing fuel and air prior to combustion in a gas turbine engine, comprising:
   (a) a mixing duct which converges substantially uniformly as it extends from its upstream end to its downstream end;
   (b) means for providing an intense shear region in said mixing duct; and
   (c) means for injecting fuel into said mixing duct in a direction substantially perpendicular to said mixing duct, said fuel injecting means forming a centerbody which extends the full length of said mixing duct;
wherein high pressure air from a compressor is injected into said mixing duct having a length where it is uniformly mixed with fuel in the intense shear region so as to produce minimal formation of pollutants when the fuel/air mixture is exhausted out the downstream end of said mixing duct into the combustor and ignited.

* * * * *